United States Patent [19]

Miles et al.

[11] 4,452,533

[45] Jun. 5, 1984

[54] EXTERNAL CAVITY DIODE LASER SENSOR

[75] Inventors: Ronald O. Miles, Washington, D.C.; Thomas G. Giallorenzi, Springfield, Va.; Alan B. Tveten, Oxon Hill, Md.

[73] Assignee: The United States of America as represented by the Secretary of the Navy, Washington, D.C.

[21] Appl. No.: 286,099

[22] Filed: Jul. 22, 1981

[51] Int. Cl.[3] .................... G01B 9/02

[52] U.S. Cl. .................... 356/352; 356/357

[58] Field of Search .................... 356/352, 357; 372/97; 374/161; 73/655, 657, 517 R, 862.64

[56] References Cited

U.S. PATENT DOCUMENTS

| | | | |
|---|---|---|---|
| 3,476,483 | 11/1969 | Weeks | 73/655 X |
| 3,614,655 | 10/1971 | Kobayashi | 372/26 |
| 3,635,562 | 1/1972 | Catherin | 356/352 |
| 3,644,042 | 2/1972 | Kolb, Jr. et al. | 73/655 X |
| 3,855,544 | 12/1974 | Bowness | 372/97 |
| 4,079,339 | 4/1978 | Kobayashi et al. | 372/97 |
| 4,243,320 | 1/1981 | Gordon | 356/73.1 |

OTHER PUBLICATIONS

"Diode Laser Sensor", Electronics Letters, 4/12/80, vol. 16, No. 25/26, pp. 948–949.

"Fabry–Perot Interferometric Sensor", R. O. Miles, A. Dandridge, A. B. Tveten, and Thomas G. Giallorenzi, Third International Conference on Integrated Optics and Optical Fiber Communication, San Francisco, CA., Apr. 27–29, 1981.

Salathé, "Diode Lasers Coupled to External Resonators", *Applied Physics*, vol. 20, pp. 1–18, 1979.

*Primary Examiner*—William L. Sikes
*Assistant Examiner*—Matthew W. Koren
*Attorney, Agent, or Firm*—Robert F. Beers; William T. Ellis; Kenneth E. Walden

[57] ABSTRACT

A sensor for sensing conditions such as acoustic waves, temperature changes, acceleration current and magnetic fields. The sensor employs a diode laser having its cavity contained between end facets defined by partially reflective mirrors, supplemented by an external cavity formed between one of the end facets of the laser and a translatable external reflector. The reflector is position-responsive to a condition to be sensed. A change in the reflector's positions causes laser output light to be fed back through the mirror into the laser cavity with varying phase such that an increase or decrease in laser emission is created. A change of detector voltage or change in laser current provides an indication of environmental condition being sensed.

11 Claims, 10 Drawing Figures

EXTERNAL CAVITY DIODE LASER SENSOR

BACKGROUND OF THE INVENTION

Traditionally, environmental condition sensors utilize effects of the environment which induced a voltage or current changes in a circuit to cause electrical changes which are usually measured in the form of a readable or recordable mechanical deflection. Some of these systems are bulky and relatively insensitive to the conditions for which they are intended.

There is an increasing interest in the use of optics for sensing acoustic waves, temperature changes, acceleration and ac magnetic fields, as well as other environmental conditions. In each case, the sensor must be sensitive to the field or condition to be sensed or measured, while at the same time it must be insensitive to unwanted perturbations. Recently, there has been considerable interest in sensors employing single mode optical fibers arranged in the form of a Mach-Zehnder interferometer wherein the incident field or condition to be sensed or detected induces a phase modulation in light passing through different arms thereof. This is more fully discussed in Measurements of Small Phase Shifts Using a Single Mode Optical Fiber Interferometer, Opt. Lett., 1980, 5 pp. 139–141. Other approaches using optical fibers rely on intensity modulation transduction mechanicians. See, for example, the article by Schilieren entitled Multimode Fibre-Optic Hydrophone, Appl. Phys. Lett. 1980, 37, pp. 145–147.

SUMMARY OF THE INVENTION

The present invention relates to an environmental field or condition detector employing a single mode diode laser having its cavity defined by a series of partially reflecting mirrors at axially opposite ends of a semiconductor diode, and an external reflector spaced from one of the semiconductor diode mirrors for defining an external cavity. A detector is spaced axially outwardly from the mirror at the opposite end of the laser for reading variations in laser output. The external reflector is selectively spaced at a distance from its end mirror so that sensitivity is maximized. Movement imparted to the external reflector by the environmental condition (perturbations: e.g., acoustic waves, ac magnetic fields, acceleration or change in thermal conditions), changes the length of the external cavity and causes a phase shift in light being fed back into the laser cavity. This resulting phase shift causes a change in laser light output or drive current. The light change is detected by a detector which correlates the light change to the change in the environmental condition. Environmental changes also causes a change in the laser diode drive current which can be read directly. Reference may be made to ELECTRONICS LETTERS, Dec. 4, 1980, Vol. 16 No. 25/26 pp. 948–949 for a report on the subject matter of the invention.

OBJECTS OF THE INVENTION

It is therefore an object of the invention to provide a sensor for sensing an environmental condition change.

It is a further object of the invention to provide a sensor for sensing changing environmental conditions such as acoustic waves, temperature changes, acceleration and ac magnetic fields.

It is still a further object of the invention to provide a laser with an external reflector spaced from one end thereof whereby the external reflector is responsive to a change in environmental conditions to cause phase shifts in the light fed back by the external reflector resulting in a change in laser threshold and therefore light output or driving current to indicate a change in environmental condition.

Other objects of the invention will become apparent to one upon reading the specification and claims when considered in conjunction with the drawings herein.

DETAILED DESCRIPTION OF THE EMBODIMENTS

Figure 1:
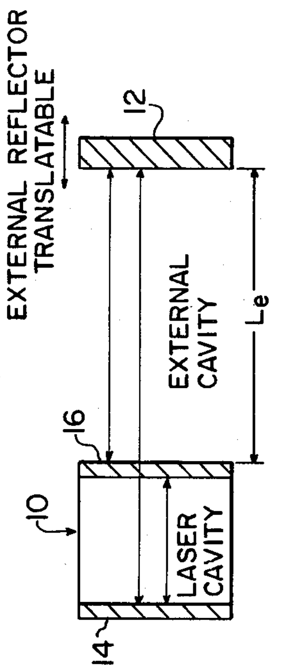
FIG. 1 is a representation of the diode laser and an external reflector defining an external cavity.

Referring now to the drawings, where like reference numerals are applied, where applicable, to like elements and features throughout the several embodiments, there is shown in FIG. 1 a representation of a single mode diode laser 10 ($\lambda = 830$ nm) and an external reflector 12 positioned within a short distance $L_e$ (a few wavelengths) of one of the laser facets. The laser diode cavity is formed between facets defined by partially reflective mirrors 14 and 16. The laser serves as a source of coherent light emitted from its opposite ends through the partially reflective mirrors. A cavity, external to that formed between the diode mirrors, is formed between reflector 12 and one of the diode laser facets (mirror 16). Reflector 12 is used to feed laser output light back through mirror 16 into the laser diode cavity. External reflector 12 is positionable at selected distances from the end facet (mirror 16) so as to maximize or minimize the laser output or at a most sensitive point, i.e. substantially midway between maxima and minima. Reflector 12 is exposed to, and is, therefore, subject to the environmental field condition. Perturbations in the field condition are transmitted to the reflector and cause it to move slightly away from its initially selected position. These movements cause a minute change in external cavity length $L_e$, which results in a phase change in light reflected back toward the cavity. The output light intensity emitted from the laser is represented by waveform 18 in FIG. 2 as a function of mirror 12 position. By positioning the external mirror such that the laser output-current characteristics shown in FIG. 3 match those of the free-running laser (the condition when no external reflector is present), the device will be set at maximum sensitivity, allowing a slight displacement of the external mirror to give maximum amplitude variation in the output of the laser. The position of the external reflector, however, is perturbed slightly by the incident field to be measured. The output of the laser is measured by a large area photodiode placed at the rear facet of the laser. The phase of the light fed back from the external reflector is determined by the distance $L_e$ and the perturbation of the external reflector. The laser facet reflectance R in the presence of an external reflector r is determined the the formula:

$$R=R_o+2(1-R_o)\sqrt{rR_o}\cos\theta$$

where $R_o$ is the facet reflectance without feedback, r is the reflectivity of the external reflector and $r<<R$, and $\theta$ is the angle of the phase of the reflected light.

When light is fed back in phase with the light in the laser cavity the effect is to raise the facet reflectance; when the light is out of phase the facet reflectance is lowered. The gain at lasing threshold $G_o$, with a single external reflector, is given by the formula:

$$G_o=(1/2L)\ln R_oR$$

where $R_o$ is the facet reflectance without feedback, L is the length of the laser cavity and R the facet reflectance with feedback. Consequently, the threshold current level may be changed by altering the phase of the light fed back into the laser cavity.

Figure 2:
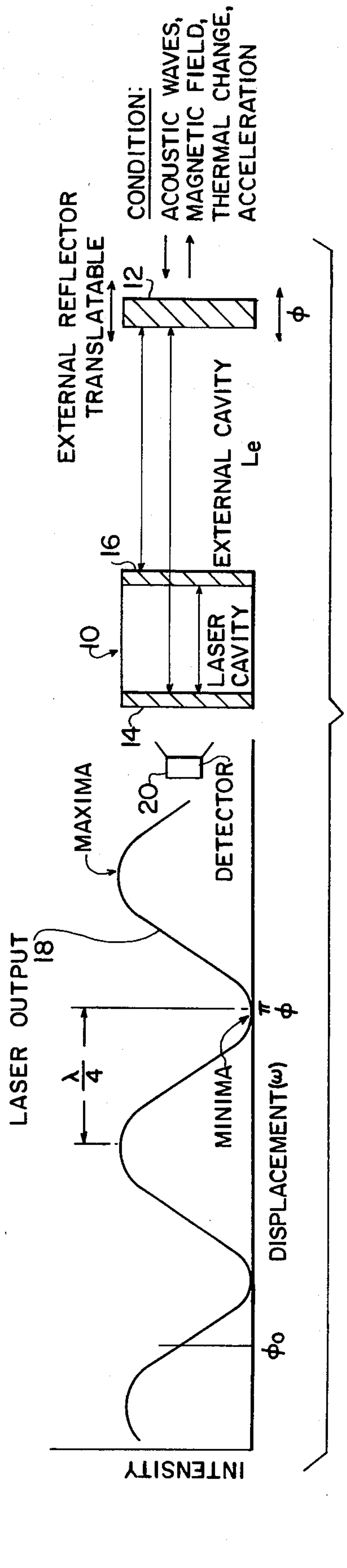
FIG. 2 is a schematic representation of a sensor arranged according to the present invention.
Figure 3:
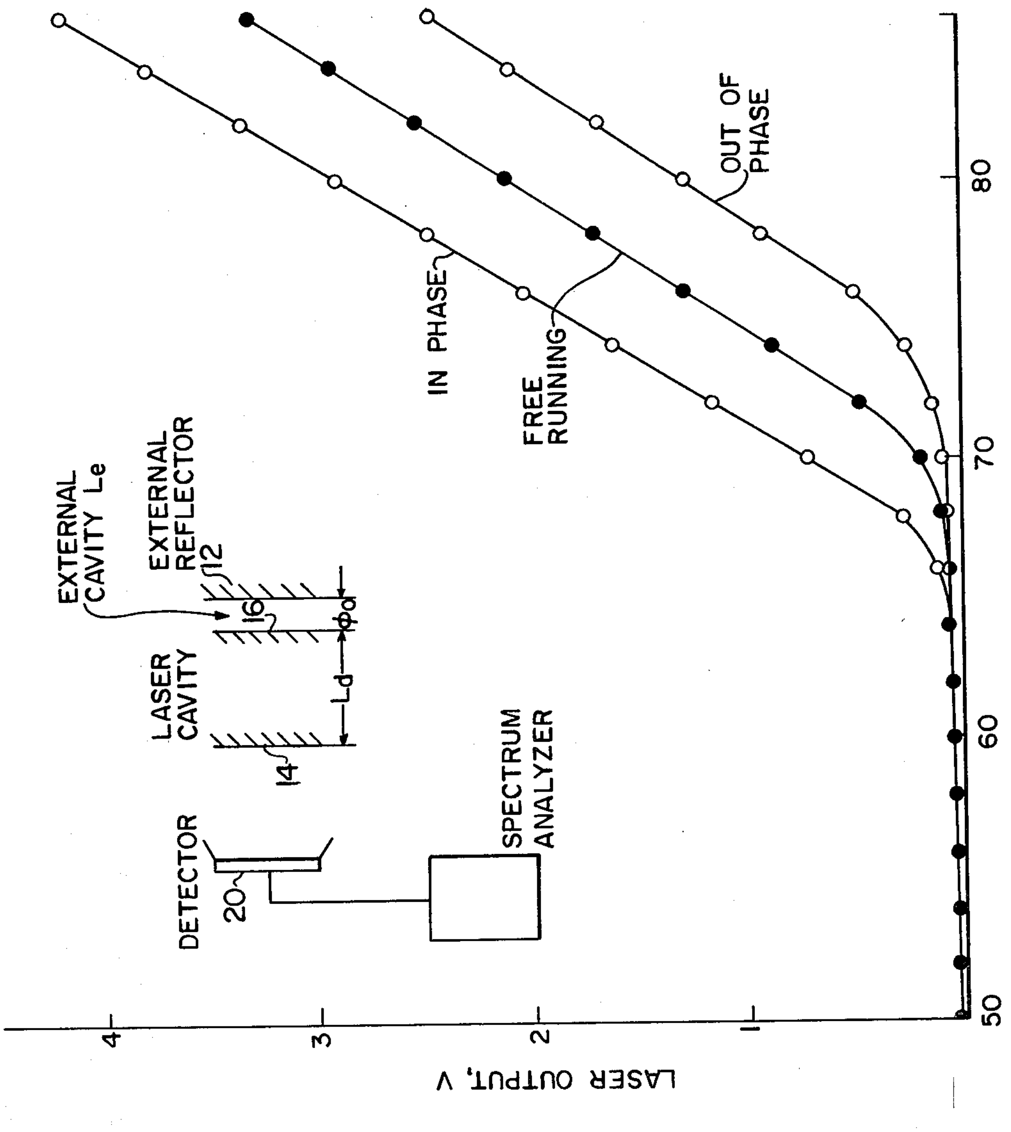
FIG. 3 is a graph illustrating laser output as a function of driving current and external reflector position.

FIG. 3 illustrates laser light output characteristics as a function of current with feedback for critical positions of external reflector 12. The solid circles represent the output characteristics of a free running laser (HLP1400) with no external cavity feedback. The open circles to the left represent the output characteristics of the laser when reflector 12 has been repositioned, such as by perturbations caused by changed environmental field conditions, and reflections are fed back in phase with the laser. The open circles to the right represents the output characteristics of the laser when reflector 12 has been further repositioned such as by field perturbations. Reflections are then fed back out of phase with the laser. The displacements between the maximum and minimum in the laser intensity output as shown in FIG. 2 corresponds to a quarter wavelength ($\lambda=830$ nm for a GaAlAs diode laser). Most commonly, the initial positioning of reflector 12 is such that operation at $\Phi_o$ is achieved. This allows significant amplitude variation in the laser output with only a few nanometers perturbation in external reflector 12. This effect can be utilized in the design of very sensitive devices to be disclosed hereinafter.

FIGS. 5–9 represents sensors for sensing various environmental conditions. The sensors comprise a laser source and an external cavity formed in accordance with the above description placed in a slot etched in a silicon substrate. The principle of the laser amplification illlustrated in FIG. 2 is employed throughout the several embodiments illustrated in FIGS. 5–9 for detecting a change in environmental conditions. In each embodiment the external reflector is initially positioned so that the output/current characteristics are the same as the free-running laser.

ACOUSTIC DETECTOR

Figure 5:
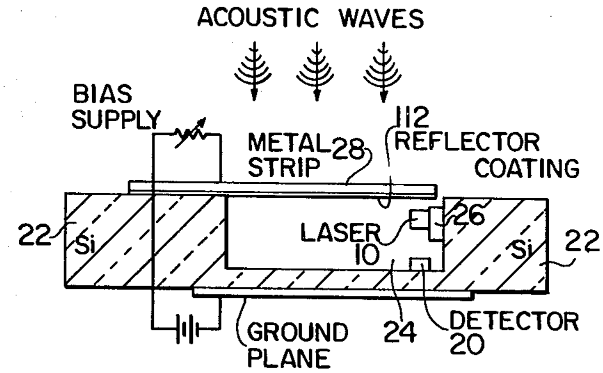
FIG. 5 shows a compact acoustic sensor employing a cantilever-mounted beam or strip supporting the external reflector spaced from the laser.
Figure 6:
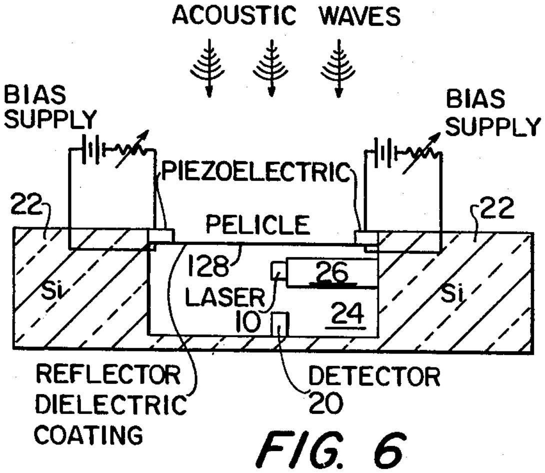
FIG. 6 shows a compact acoustic sensor of different form employing a reflector formed on the laser-facing side of an acoustic wave responsive membrane.

In FIGS. 5 through 9, there is shown a silicon substrate 22 in which a notch or slot 24 has been provided as by etching. Laser 10 and heatsink 26 are mounted on a side wall of the notch as shown in FIGS. 5, and 7–9. In the FIG. 6 embodiment, the laser and heatsink are mounted slightly differently to allow selected positioning in a different embodiment. The arrangement illustrated in FIGS. 5 and 6 are for detecting acoustic pertubations, i.e., sound waves. In FIG. 5, the external cavity is formed between laser 10 and a reflector 112 defined by a coating, such as a dielectric, applied to the inner surface of a cantilever-mounted member, such as a metal beam or strip 28. As previously disclosed, the distance between the laser facet and the external reflector defines an external cavity which is only a few microns or light wavelengths long. Metal strip 28 is electrically biased for causing it to assume an initial position of maximum sensitivity. Acoustic sensitivity of the detector is derived from vibrations imparted to the cantilevered strip. Acoustic waves from an environmental source strike strip 28 and cause it to vibrate reflector 112 toward and away from the facet mirror of laser 10. Perturbations imparted to the external reflector move it from either side of its initial $\Phi_o$ setting to cause a fluctuating amplitude output from the laser which is detected by photodiode detector 20.

An alternate embodiment of the acoustic sensor is illustrated in FIG. 6. Silicon substrate 22 is provided with a notch 24, similar to that disclosed in FIG. 5, and the cantilever-mounted strip is replaced by a flexible membrane or pellicle 128 which is stretch-mounted across small piezoelectric blocks or cylinders 30 cemented to the silicon substrate. This membrane is provided with a highly reflective coating, such as a metal or dielectric on its inner surface to define an external reflector facing the laser. Electrical bias applied to the piezoelectric blocks places the membrane reflector at an initial position $\Phi_o$, and subsequent acoustic waves impinging against the membrane move the reflector toward and away from the laser facet to modulate the laser output. The reading by detector 20 translates into an indication of the presence of an acoustic field.

The resonance (frequency response) of the diaphram (pellicle) may be altered (tuned) by biasing the piezoelectric blocks or cylinders. When the bias voltage is changed, the diameter of the piezoelectric cylinder enlarges or decreases in size, making the diaphram tighter or less taut.

THERMAL SENSOR

Figure 7:
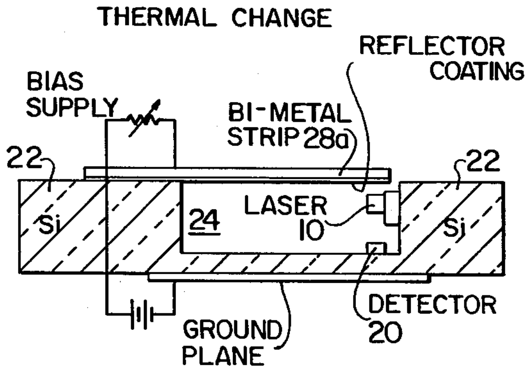
FIG. 7 shows a temperature sensor employing a temperature responsive bi-metallic cantilever-mounted beam or strip supporting the external reflector.

There is shown in FIG. 7 a sensor for sensing a changing thermal condition. The arrangement is very similar to the acoustic sensor disclosed in FIG. 5. However, cantilevered strip 28*a* is formed of a bimetallic material (not illustrated) having different thermal expansions, so that, when exposed to temperature changes, they assume a change in shape. The internally facing surface of beam 28*a* is provided with a reflective coating such as $SiO_2$ to define a movable external reflector. As in FIG. 5, the cantilevered strip is biased for causing the external mirror (reflective surface) to assume the desired initial $\Phi_o$ sensitivity position. With a temperature change in the environment surrounding the strip, the bi-metal members cause the stip to deflect to further change the position of the reflector toward or away from the laser facet. This action, as before, shifts the phase of the light fed back into the laser. The modulated output from laser 10 is detected by photodiode detector 20, and a change in its reading provides an indication of an environmental thermal change.

ACCELEROMETER

Figure 8:
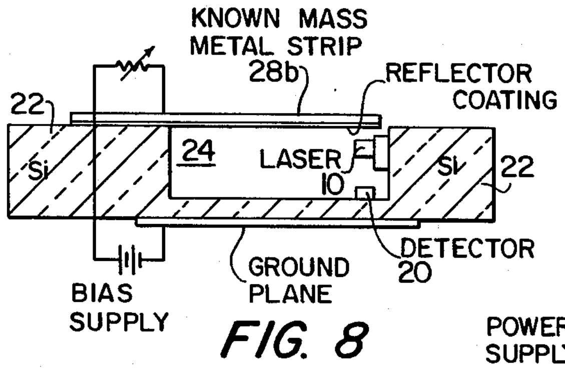
FIG. 8 shows an accelerometer employing a mass in the form of a cantilever-mounted beam or strip supporting the external reflector.

FIG. 8 illustrates an accelerometer formed according to the present invention. Laser 10 with heatsink 26 are mounted in slot 24 of silicon substrate 22, as in the other embodiments. A cantilever-mounted metal strip **28*b* of known mass is mounted on the silicon substrate. This strip is provided with a reflective coating such as $SiO_2$ on its inner surface to define the external reflector. An external cavity is formed between the reflector and laser facet. Cantilevered strip 28*b* is provided with a bias, such as an electrical bias, to initially position the reflector relative to the laser facet at sensitivity point $\Phi_o$. By knowing the mass and flexibility of the cantilevered strip, the phase shift induced in the laser output and change in detector 20 reading is proportional to the inertial forces on the cantilevered strip. The acceleration can be found from the relationship $F=ma$. Detection of a signal is from detection of threshold-current variations or from the photodetector 20**.

MAGNETIC FIELD DETECTOR

Figure 9:
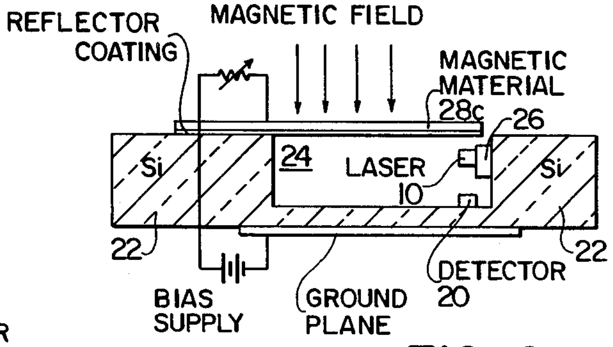
FIG. 9 shows a magnetic field sensor employing a cantilever-mounted magnetic field sensitive metal strip supporting the external reflector.

The same general arrangement is provided for measuring magnetic fields. An embodiment for this purpose is illustrated in FIG. 9. Laser 10 with heatsink 26 and detector 20 are mounted in slot 24 of silicon substrate 22. Cantilevered strip **28*c*, formed of a magnetic material, is bonded to the silicon substrate for mounting over the slot cavity. Its inner surface is provided with a reflective coating for defining an external reflector. Again, the strip is biased, whereby the reflector carried thereon is caused to assume the initial sensitivity position $\Phi_o$. When the device is orientated in the direction of the magnetic field, as illustrated in FIG. 9, small movement of the reflector toward or away from the laser facet in response to this ac magnetic field induces significant changes in the phase of the light reflected back into the laser thereby modulating the laser output. Detector 20** reads the change in laser output as an indication of magnetic field change.

By using this device to measure the magnetic field generated by a current flowing through a conductor provides a means of measuring the current amplitude in the conductor.

An alternative construction may consist of a reflector mounted on a magnetostrictive material. This material when properly biased with a d.c. magnetic field can be made sensitive to small changes in a.c. magnetic fields, and responds by changing its physical dimensions linearly with the magnetic field change. In this configuration the mirror is attached to the magnetostrictive material which is mounted to a piezoelectric tube or stack. The piezoelectric material positions the mirror for maximum sensitivity in front of the laser facet. Slight changes in the magnetic field causes the magnetostrictive material to reposition the mirror slightly.

Figure 4:
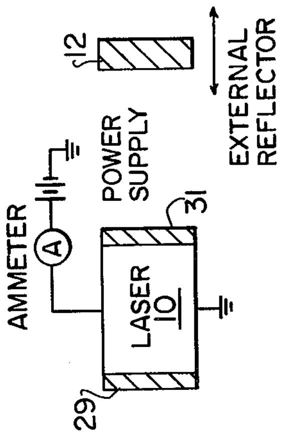
FIG. 4 is a schematic representation of a detector employing a threshold-current monitoring scheme.

In FIG. 4, the field sensor makes use of the diode current variations induced by reflected light phase variations. As illustrated, the same laser cavity is employed but there is no photodetector. That end or facet of the laser is provided with one fully reflective mirror 29, and the other end is provided with partially reflective mirror 31. A means is provided to drive the laser with sufficient current to bring it above its lasing threshold. The light output-current characteristics are monitored by means of an ammeter or oscilloscope (not illustrated) which in effect monitors slight changes in the driving current necessary to maintain the laser at lasing threshold induced by the variations in phase of reflected light.

Figure 10:
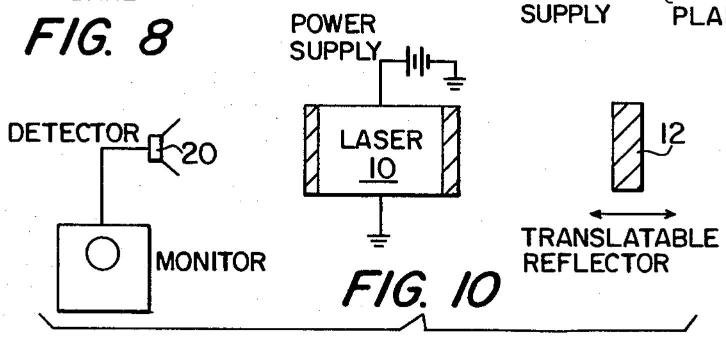
FIG. 10 is a schematic representation of a sensor employing diode current variations induced by reflected light phase variations.

FIG. 10 is provided for illustrating an environmental condition sensor similar to other environments which make use of the amplitude variations detected by the photodetector.

There has been disclosed several embodiments for detecting changing environmental conditions such as displacements, acoustic waves, magnetic fields, current, acceleration and thermal conditions. When employing laser feedback, the device can be made extremely sensitive since a small change in phase of the reflected light, when the external reflector is adjusted to an initial $\Phi_o$ position, creates a substantial amplitude variation in the laser output. Since the size of the diode laser and detector can be provided in millimeter dimensions, and the length of the external cavity in microns to a few millimeters, the sensors can be small, light weight, compact, and yet quite sensitive. Furthermore, the device is non-perturbating to the field or condition being sensed.

While the invention has been particularly shown and described with reference to several specific embodiments, it will be understood by those skilled in the art that various changes in form and detail may be made therein without departing from the spirit and scope of the invention which is limited only by the claims annexed thereto.

What is claimed and desired to be secured by Letters Patent of the United States is:

1. A sensor for sensing a change in environmental condition comprising:

a diode laser having radiation output from opposite facets defined by partially reflective mirrors;

an external reflector means spaced from one facet for defining an external cavity therebetween, said external reflector means reflecting the radiation output back to the laser and wherein said external reflector means changes in position relative to the one facet in response to a change in environmental conditions, the external reflector means being carried by a cantilever-mounted member adapted for exposure to environmental condition;

a photodetector spaced from the other facet for detecting laser output intensity;

whereby position changes of the external reflector means cause phase shifts in light reflected back to the laser facets which affects reflectance of the partially reflective mirrors to cause a change in laser output intensity which is detected by said photodetector, thereby indicating a change in environmental conditions.

2. The invention according to claim 1 further defined by a dielectric coating on a surface of the cantilevered member facing the laser for defining the external reflector means.

3. A sensor for sensing a change in environmental condition comprising:

a diode laser having radiation output from opposite facets defined by partially reflective mirrors;

an external reflector means spaced from one facet for defining an external cavity therebetween, said external reflector means reflecting the radiation output back to the laser and wherein said external reflector means changes in position relative to the one facet in response to a change in environmental conditions, the external reflector means being carried by a bi-metallic cantilever mounted member, which, upon exposure to an environmental condition thermal change, undergoes position change resulting in a change in laser output intensity in response to change in environmental temperature;

a photodetector spaced from the other facet for detecting laser output intensity;

whereby position changes of the external reflector means cause phase shifts in light reflected back to the laser facets which affects reflectance of the partially reflective mirrors to cause a change in laser output intensity which is detected by said photodetector, thereby indicating a change in environmental conditions.

4. The invention according to claim 3 wherein a surface of the bi-metallic strip facing the laser is provided with a dielectric coating defining the external reflector means.

5. A sensor for sensing a change in environmental condition comprising:

a diode laser having radiation output from opposite facets defined by partially reflective mirrors;

an external reflector means spaced from one facet for defining an external cavity therebetween, said external reflector means reflecting the radiation output back to the laser and wherein said external reflector means changes in position relative to the one facet in response to a change in environmental conditions, the external reflector means being carried by a cantilever mounted member of magnetic material, which, upon exposure to an environmental condition magnetic field change, undergoes further position change to cause a phase shift and detectable change in laser output intensity for detecting a magnetic field;

a photodetector spaced from the other facet for detecting laser output intensity;

whereby position changes of the external reflector means cause phase shifts in light reflected back to the laser facets which affects reflectance of the partially reflective mirrors to cause a change in laser output intensity which is detected by said photodetector, thereby indicating a change in environmental conditions.

6. The invention according to claim 5 wherein a surface of the magnetic material strip facing the laser is provided with an $SiO_2$ coating defining the external reflector means.

7. A sensor for sensing a change in environmental condition comprising:

a diode laser having radiation output from opposite facets defined by partially reflective mirrors;

an external reflector means spaced from one facet for defining an external cavity therebetween, said external reflector means reflecting the radiation output back to the laser and wherein said external reflector means changes in position relative to the one facet in response to a change in environmental conditions, and further defined by the external reflector being carried by a cantilever mounted member of known mass, such that, upon inertial change, the member momentarily repositions the external reflector relative to the laser for causing a detectable change in laser output intensity;

a photodetector spaced from the other facet for detecting laser output intensity;

whereby position changes of the external reflector means cause phase shifts in light reflected back to the laser facets which affects reflectance of the partially reflective mirrors to cause a change in laser output intensity which is detected by said photodetector, thereby indicating a change in environmental conditions.

8. The invention according to claim 7 wherein a surface of the cantilever mounted mass member facing the laser is provided with a dielectric coating defining the external reflector means.

9. A sensor for sensing a change in environmental condition comprising:

a diode laser having an internal cavity defined between partially reflective mirrors and adapted for providing radiation output at opposite ends;

an external reflector means spaced only a few wavelengths from one of the laser ends and defining an external cavity therebetween, wherein no coupling optics are included between said one laser end and said external reflector means, said external reflector means being position-responsive to environmental condition changes for changing the external cavity length, thereby inducing phase shifts in light reflected back to the laser for changing reflectivity of the mirrors and causing a change in laser output intensity;

a photodiode detector spaced from the other end of the laser for detecting changes in laser output intensity, such changes in intensity indicating a change in environmental condition.

10. A sensor for sensing a change in environmental condition comprising:

a diode laser having radiation output from opposite facets defined by partially reflective mirrors;

an external reflector means spaced from one facet for defining an external cavity therebetween, said external reflector means reflecting the radiation output back to the laser and wherein said external reflector means changes in position relative to the one facet in response to a change in environmental conditions, the external reflector means being carried on a membrane spaced from said one end of the laser and adapted for exposure to environmental condition acoustic perturbations;

piezoelectric members between which the membrane is mounted;

a photodetector spaced from the other facet for detecting laser output intensity;

whereby position changes of the external reflector means cause phase shifts in light reflected back to the laser facets which affects reflectance of the partially reflective mirrors to cause a change in laser output intensity which is detected by said photodetector, thereby indicating a change in environmental conditions.

11. The invention according to claim 10 wherein the piezoelectric means upon electrical activation moves to initially position the external reflector.

* * * * *